ROTARY HEAD POSITION ADJUSTING APPARATUS

Filed July 17, 1963 2 Sheets-Sheet 1

NORMAN ECCARIUS,
JOHN A. LOMAX and
WILLIAM J. MARTIN,
INVENTORS

BY Robert G. Clay

ATTORNEY

NORMAN ECCARIUS,
JOHN A. LOMAX and
WILLIAM J. MARTIN,
INVENTORS

BY Robert G. Clay

ATTORNEY 3,319,015

ROTARY HEAD POSITION ADJUSTING APPARATUS

Norman Eccarius and John A. Lomax, Redwood City, and William J. Martin, Sunnyvale, Calif., assignors to Ampex Corporation, Redwood City, Calif., a corporation of California Filed July 17, 1963, Ser. No. 295,788
9 Claims. (Cl. 179—100.2)

This invention relates to transducing head mounting means, particularly for the rotating head drum of a wideband magnetic tape transport.

Previously, magnetic transducing heads have been mounted in wideband tape transports by means of a rotating drum that causes the heads to sweep repeatedly across the tape. Such machines often employ two such transducing heads located 180 degrees apart or four heads located 90 degrees apart on the periphery of the drum.

One of the problems to be overcome in the use of such transducing heads, particularly in television tape transports, is the problem of establishing and keeping the heads at a predetermined angular spacing so that tapes produced by one machine will be reproducible on other machines of the same class, without error or distortion of the television picture. Another problem is that of positioning the heads at the correct radial dimension from the axis of drum rotation, so that head-to-tape pressure will be at an optimum value to avoid clogging of the heads by oxide scraped from the tape.

Means for positioning the heads have usually employed a clamp to hold the head in its final setting. A further problem with such devices is to make the adjustments with the clamp loosened, to avoid the frictional force of the clamp and stiction forces that inhibit the making of the adjustment accurately without loosing the adjusted setting before the clamp can be re-tightened.

Accordingly, it is an object of this invention to provide a transducing head mount operable to accurately adjust the radial and peripheral position of the head on a rotating drum.

It is another object of the invention to provide a mount as above described and functioning smoothly without the dangers of stiction effects or loss of setting.

It is a further object of the invention to provide a mount as above described and suitable for easy and inexpensive manufacture and operation.

A mount in accordance with the invention utilizes three identical modular elements mounted on the head drum for positioning each head as a stable beam, i.e., with two elements bearing at spaced points against one side of the head and another element bearing against the other side of the head at an intermediate point. Each of the elements includes a leaf spring and is thereby capable of resilient change of dimension along one axis. Tapered screws are provided for inducing and holding such dimensional changes. A clamp is provided for holding the head firmly in position against centrifugal and axial forces when the head drum is rotating, but the arrangement of the modular elements tends to prevent loss or accidental change of peripheral head position when the clamp is loosened with the drum stationary. The three modular elements together are operable to cause circumferential position changes of the head, and one of the modular elements is operable to adjust the radial position of the head. Although extremely precise adjustments may be obtained, the elements are so arranged that there are no critical dimensions or exacting tolerances to be met in manufacture. Thus the three elements are made identical and very inexpensively.

A better understanding of the invention may be had by reference to the following description, taken in conjunction with the accompanying drawings, in which.

Figure 1:
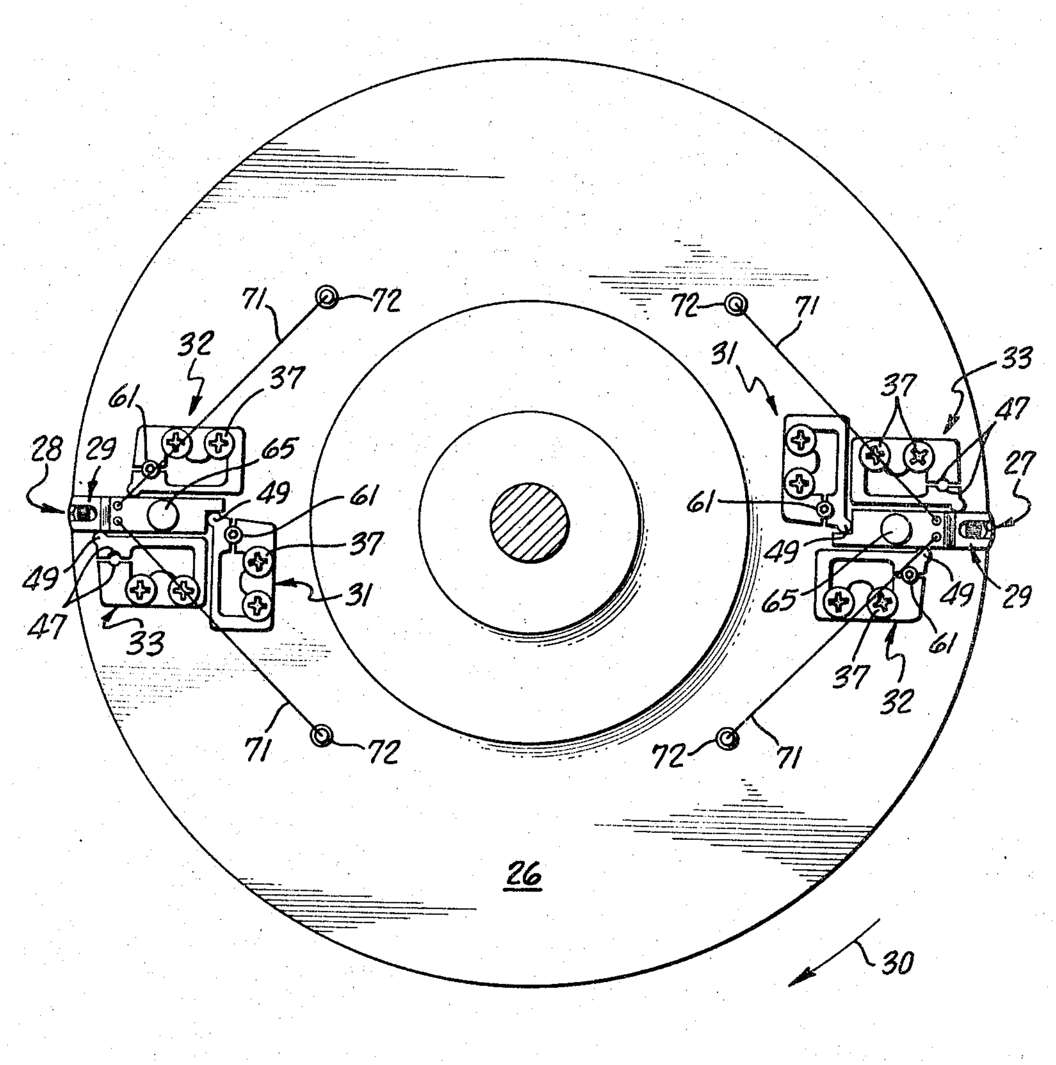
FIGURE 1 is a cross section plan of a portion of a rotating head mechanism.

Referring now to the drawings and particularly to FIGURE 1 thereof, there is shown a rotating head drum 26. On the head drum 26 are mounted a pair of magnetic transducing heads 27 and 28 at opposite ends of a common diameter, i.e., 180 degrees apart, each transducing head being carried in an elongated mounting unit 29. Thus upon each revolution of the drum (in a clockwise direction as shown by the arrow 30) both heads in sequence make complete sweeps across the width of a tape (not shown), and information is recorded or reproduced as desired.

Figure 2:
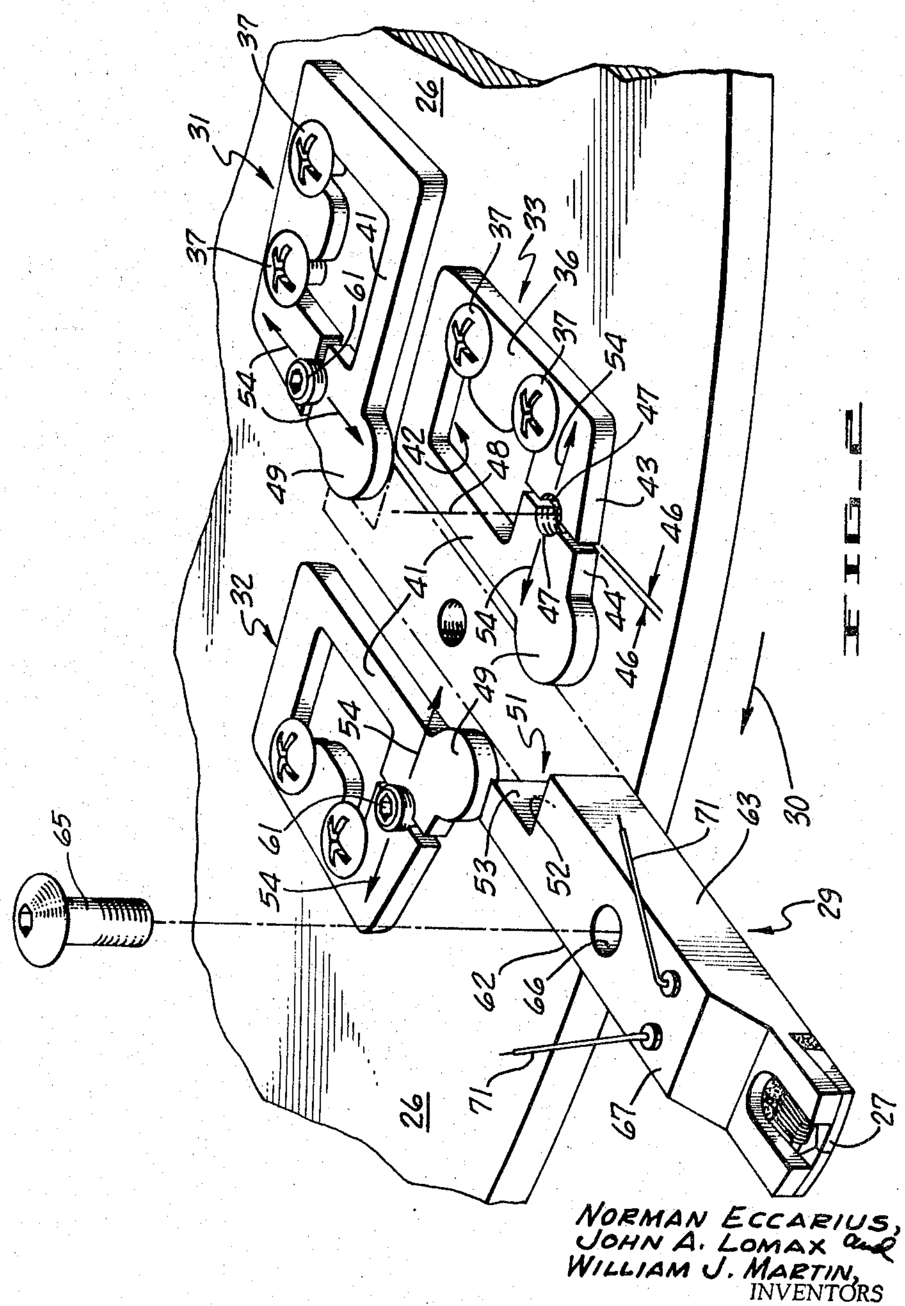
FIGURE 2 is an enlarged, exploded perspective showing a portion of the apparatus shown in FIGURE 1.

As previously explained, it is important to be able to mount the heads 27, 28 so that they have a predetermined angular spacing and are spaced at a predetermined radial distance from the rotational axis of the drum 26. In a preferred application, the angular spacing must be within three millionths radian of 180 degrees or of an angle that is different from 180 degrees by a multiple of $^{180}/_{525}$ degree; and the radial dimension must be within .001 inch of the desired radial dimension. Accordingly the present invention provides, for each of the heads, a group of three identical modular elements 31, 32 and 33, also illustrated in FIGURE 2. Each of these modular elements includes a base portion 36 by which the element is firmly mounted on the head drum 26 as by means of a pair of bolts 37. Extending from one end of the base portion is a resilient portion 41. The resilient portion 41 extends in the same direction as the base portion 36 from the zone of juncture 42 of the two portions, so that the extending ends 43 and 44 of the two portions are spaced apart for a selectively variable dimension 46. These extending ends 43 and 44 are provided with confronting threaded portions 47 formed substantially on the same axis 48, this axis being perpendicular to the plane of the element intermediate the two ends 43, 44 in the space 46. These threaded portions 47 are used as hereinafter described for controlling the spacing 46 between the base and resilient portions 36, 41 of the element. Also, in order to provide substantially tangential engagement between the rounded portion 49 of the element and the planar sides of the transducing head mounting unit 29, the end 44 of each resilient portion 41 has an enlarged are rounded tip 49.

In order to provide mounting surfaces for the element 31, the unit 29 is cut away at the radially inward and trailing corner to define a re-entrant notch 51 presenting a radially inwardly facing surface 52 and a trailing surface 53. The words "leading" and "trailing" are used herein to define respective portions of the apparatus relative to the direction of rotational motion represented by the arrow 30 previously described.

It will be readily seen that each of the modular elements 31–33 has a variable dimension in a direction transverse to the space 46 thereof, as represented by an arrow 54. Thus in order to provide radial positioning of the head 27 and unit 29, one of the modular elements, namely the element 31, is mounted so that its enlarged and rounded tip 49 engages the radially inward face 52 of the notch 51, and with the variable dimension 54 of the element aligned along the radius of the drum that passes through the unit 29. A tapered screw 61 is then threaded into the threaded portions 47 of element 31 so as to urge the resilient portion 41 and tip 49 of the element toward the unit 29 as the screw 61 is threaded more deeply into the element.

In order to provide angular or circumferential positioning of the head 27 and unit 29, the unit is also positioned so that the trailing face 53 of the notch 51 engages the tip 49 of the element 31; and the elements 32 and 33 are mounted on the head drum with their enlarged and rounded tips 49 engaging the unit 29 as follows. The unit 32 is mounted with its tip 49 engaging the leading side 62 of the unit 29 intermediate the length of the unit; and the element 33 is mounted on the head drum with its tip 49 engaging the trailing side 63 of the unit 29 at a point intermediate the unit 32 and the periphery of the drum 26. Thus it will be seen that the three elements 31–33 establish the lateral position of the unit 29 as by loading the unit in the manner of a stable beam. In other words the two units 31 and 33 bear against one side (represented by the trailing side 63 and trailing face 53 of the unit), the bearing points being spaced substantially far apart; while the unit 33 is arranged to bear against the opposite or leading side 62 of the unit 29 at a point intermediate the points at which the elements 31 and 33 engage the unit 29. The unit 32 also has a tapered screw 61 threaded into its threaded portions 47 for adjusting in setting the lateral position of unit 29. The unit 33 could be provided with such a tapered screw either alternatively to or in addition to the screw 61 of unit 32, but is here shown as being without such a screw. The snug engagement of the three elements laterally with unit 29 is nevertheless established by means of the single tapered screw 61 that is provided by the element 32, the element 31 providing a substantially fixed fulcrum or pivot point so far as lateral movement of the unit 29 is concerned, while the unit 33 provides resilient variable engagement in the same direction. The choice of which element 32 or 33 is to be provided with the single tapered screw 61 is dictated by the arrangement of means for holding the unit 29 against the drum 26, this means being here shown as a clamping bolt 65 passing loosely through a very much larger diameter opening 66 in the unit 29 and threaded into the drum 26. When the bolt 65 is tightened to engage the top side 67 of the unit 29, the unit is clamped in the position to which it has been moved by adjustment of the tapered screws 61. When the bolt 65 is loosened, the looseness between the bolt and the opening 66 permits further movement and adjustment of the position of the unit 29 by means of the elements 31–33. Thus it will be seen that adjustments do not have to be made with the bolt 65 tight in order to prevent loss of the setting by accident. As the bolt 65 is loosened, adjustments may be made by operation of the tapered screws 61, and all three of the elements 31–33 continuously tightly engage the unit 29 in such a way that the setting cannot be accidentally lost before the retightening of the bolt 65. It should be noted that the bolt is positioned in the unit 29 midway between the bearing points of the elements 31 and 32. Consequently with a standard right-hand thread on the bolt 65, the final tightening process tends to pivot the element 29 in a clockwise direction; but this tendency is solidly blocked by the elements 31 and 32. It will be seen that element 31 has no freedom in a direction lateral to the length of the unit 29, i.e., in the pivoting direction; and neither does the element 32 because of the presence of its tapered screw 61. If the bolt 65 had a left-hand thread or were otherwise located, then the provision of a tapered screw 61 for the element 33 instead of the element 32 might be preferable.

It should be noted that although the modular elements 31–33 are all identical in manufacture, the element 33 is inverted for convenience in the use of the space available on the drum 26.

Lead wires 71 are provided to connect the heads 27, 28 electrically with terminal posts 72 mounted on the head drum 26, the posts 72 being coupled through a slip ring system (not shown) to stationary electronic circuits of the machine.

Thus there has been described a head mount in accordance with the invention utilizing three identical modular elements mounted on the head drum for positioning each head as a stable beam, i.e., with two elements bearing at spaced points against one side of the head and another element bearing against the other side of the head at an intermediate point. Each of the elements includes a leaf spring and is thereby capable of resilient change of dimension along one axis. Tapered screws are provided for inducing and holding such dimensional changes. A clamp is provided for holding the head firmly in position against centrifugal and axial forces when the head drum is rotating, but the arrangement of the modular elements tends to prevent loss or accidental change of peripheral head position when the clamp is loosened with the drum stationary. The three modular elements together are operable to cause circumferential position changes of the head, and one of the modular elements is operable to adjust the radial position of the head. Although extremely precise adjustments may be obtained, the elements are so arranged that there are no critical dimensions or exacting tolerances to be met in manufacture. Thus the three elements are made identical and very inexpensively.

What is claimed is:

1. In a rotating head drum for a magnetic tape transport, means for mounting transducing heads on said drum, comprising:
   - a plurality of elements each being selectively variable in dimension in a predetermined direction;
   - a first of said elements being mounted on said drum and engaging one of said heads on the radially inward end thereof and on one side, with said predetermined direction of said first element being aligned with the radius of said drum at said one head;
   - a second of said elements being mounted on said drum and engaging said one head on the other side thereof, with said predetermined direction of said second element aligned transverse to said radius;
   - a third of said elements being mounted on said drum and engaging said one side of said head, between said second element and the periphery of said drum, with said predetermined direction of said third element transverse to said radius; and
   - means for holding said head against said drum.

2. In a rotating head drum for a magnetic tape transport, means for mounting transducing heads on said drum, comprising:
   - a plurality of identical modular elements each being selectively variable in dimension in a predetermined direction;
   - a first of said elements being mounted on said drum and engaging one of said heads on the radially inward end thereof and on one side, with said predetermined direction of said first element being aligned with the radius of said drum at said one head;
   - a second of said elements being mounted on said drum and engaging said one head on the other side thereof, with said predetermined direction of said second element aligned transverse to said radius;
   - a third of said elements being mounted on said drum and engaging said one side of said head, between said second element and the periphery of said drum, with said predetermined direction of said third element transverse to said radius; and
   - means for holding said head against said drum.

3. In a rotating head drum for a magnetic tape transport, means for mounting transducing heads on said drum, comprising:
   - a plurality of identical modular elements each being provided with a base portion and a resilient portion extending therefrom;
   - the base portion of a first of said elements being mounted on said drum with the resilient portion of said first element engaging one of said heads on the radially inward end thereof and on one side, so as to urge said one head radially outwardly and so as to positively limit movement of said end of said head in the direction of said one side thereof;

the base portion of a second of said elements being mounted on said drum with the resilient portion of said second element engaging said one head on the other side thereof, so as to urge said one head in the direction of said one side thereof;

the base portion of a third of said elements being mounted on said drum with the resilient portion of said third element engaging said one side of said head, between said second element and the periphery of said drum, so as to urge said one head in the direction of said other side thereof; and means for holding said head against said drum.

4. In a rotating head drum for a magnetic tape transport, means for mounting transducing heads on said drum, comprising:

a plurality of identical modular elements each being provided with a base portion and a resilient portion extending therefrom, said portions extending in the same direction from their zone of juncture and the extending ends of said portions being spaced apart for a selectively variable dimension;

the base portion of a first of said elements being mounted on said drum with the resilient portion of said first element engaging one of said heads on the radially inward end thereof and on one side, so as to urge said one head radially outwardly and so as to positively limit movement of said end of said head in the direction of said one side thereof;

means positioned between and engaging said extending ends of said portions of said first element and cooperating with said resilient portion thereof to selectively vary said dimension of said first element to radially position said one head;

the base portion of a second of said elements being mounted on said drum with the resilient portion of said second element engaging said one head on the other side thereof, so as to urge said one head in the direction of said one side thereof;

the base portion of a third of said elements being mounted on said drum with the resilient portion of said third element engaging said one side of said head, between said second element and the periphery of said drum, so as to urge said one head in the direction of said other side thereof;

means positioned between and engaging said extending ends of said portions of one of said second and third elements and cooperating with the resilient portions of said second and third elements to selectively pivot said head about said first element to adjust the peripheral position of said head on said drum; and means for holding said head against said drum.

5. In a rotating head drum for a magnetic tape transport, means for mounting transducing heads on said drum, comprising:

a plurality of identical modular elements each being provided with a base portion and a resilient portion extending thereform, said portions extending in the same direction from their zone of juncture and the extending ends of said portions being spaced apart for a selectively variable dimension;

the base portion of a first of said elements being mounted on said drum with the resilient portion of said first element engaging one of said heads on the radially inward end thereof and on one side, so as to urge said one head radially outwardly and so as to positively limit movement of said end of said head in the direction of said one side thereof;

a tapered screw threaded between and engaging corresponding threads in said extending ends of said portions of said first element and cooperating with said resilient portion thereof to selectively vary said dimension of said first element to radially position said one head;

the base portion of a second of said elements being mounted on said drum with the resilient portion of said second element engaging said one head on the other side thereof, so as to urge said one head in the direction of said one side thereof;

the base portion of a third of said elements being mounted on said drum with the resilient portion of said third element engaging said one side of said head, between said second element and the periphery of said drum, so as to urge said one head in the direction of said other side thereof;

a tapered screw threaded between and engaging corresponding threads in said extending ends of said portions of one of said second and third elements and cooperating with the resilient portions of said second and third elements to selectively pivot said head about said first element to adjust the peripheral position of said head on said drum; and means for holding said head against said drum.

6. In a rotating head drum for a magnetic tape transport, means for mounting transducing heads on said drum, comprising:

a plurality of identical modular elements each being provided with a base portion and a resilient portion extending therefrom, said portions extending in the same direction from their zone of juncture and the extending ends of said portions being spaced apart for a selectively variable dimension, the end of each resilient portion being enlarged and rounded to provide substantially spot engagement with one of said heads;

the base portion of a first of said elements being mounted on said drum with said enlarged and rounded end of said resilient portion of said first element engaging said one of said heads on the radially inward end thereof and on one side, so as to urge said one head radially outwardly and so as to positively limit movement of said end of said head in the direction of said one side thereof;

a tapered screw threaded between and engaging corresponding threads in said extending ends of said portions of said first element and cooperating with said resilient portion thereof to selectively vary said dimension of said first element to radially position said one head;

the base portion of a second of said elements being mounted on said drum with the enlarged and rounded end of said resilient portion of said second element engaging said one head on the other side thereof, so as to urge said one head in the direction of said one side thereof;

the base portion of a third of said elements being mounted on said drum with the enlarged and rounded end of said resilient portion of said third element engaging said one side of said head, between said second element and the periphery of said drum, so as to urge said one head in the direction of said other side thereof;

a tapered screw threaded between and engaging corresponding threads in said extending ends of said portions of one of said second and third elements and cooperating with the resilient portions of said second and third elements to selectively pivot said head about said first element to adjust the peripheral position of said head on said drum; and means for holding said head against said drum.

7. In a rotating head drum for a magnetic tape transport, means for mounting transducing heads on said drum, comprising:

a plurality of identical modular elements each being provided with a base portion and a resilient portion extending therefrom, said portions extending in the same direction from their zone of juncture and the extending ends of said portions being spaced apart for a selectively variable dimension, the end of each resilient portion being enlarged and rounded to provide substantially spot engagement with one of said heads;

the base portion of a first of said elements being mounted on said drum with said enlarged and rounded end of said resilient portion of said first element engaging said one of said heads on the radially inward end thereof and on one side, so as to urge said one head radially outwardly and so as to positively limit movement of said end of said head in the direction of said one side thereof;

a tapered screw threaded between and engaging corresponding threads in said extending ends of said portions of said first element and cooperating with said resilient portion thereof to selectively vary said dimension of said first element to radially position said one head;

the base portion of a second of said elements being mounted on said drum with the enlarged and rounded end of said resilient portion of said second element engaging said one head on the other side thereof, so as to urge said one head in the direction of said one side thereof;

the base portion of a third of said elements being mounted on said drum with the enlarged and rounded end of said resilient portion of said third element engaging said one side of said head, between said second element and the periphery of said drum, so as to urge said one head in the direction of said other side thereof;

a tapered screw threaded between and engaging corresponding threads in said extending ends of said portions of one of said second and third elements and cooperating with the resilient portions of said second and third elements to selectively pivot said head about said first element to adjust the peripheral position of said head on said drum; and means for holding said head against said drum, including a bolt passing loosely through a substantially larger opening in said head, said bolt being threaded into said drum and tightened to clamp said head in the position induced by said elements.

8. In a rotating head drum for a magnetic tape transport, means for mounting transducing heads on said drum, comprising:

a plurality of identical modular elements each being provided with a base portion and a resilient portion extending therefrom, said portions extending in the same direction from their zone of juncture and the extending ends of said portions being spaced apart for a selectively variable dimension, the end of each resilient portion being enlarged and rounded to provide substantially spot engagement with one of said heads;

the base portion of a first of said elements being mounted on said drum with said enlarged and rounded end of said resilient portion of said first element engaging said one of said heads on the radially inward end thereof and on the trailing side thereof, so as to urge said one head radially outwardly and so as to positively limit movement of said end of said head in the direction of said trailing side thereof, said head being provided with a re-entrant notch at the radially inward trailing corner thereof for engaging said first element;

a tapered screw threaded between and engaging corresponding threads in said extending ends of said portions of said first element and cooperating with said resilient portion thereof to selectively vary said dimension of said first element to radially position said one head;

the base portion of a second of said elements being mounted on said drum with the enlarged and rounded end of said resilient portion of said second element engaging said one head on the leading side thereof, so as to urge said one head in the direction of said trailing side thereof;

the base portion of a third of said elements being mounted on said drum with the enlarged and rounded end of said resilient portion of said third element engaging said trailing side of said head, between said second element and the periphery of said drum, so as to urge said one head in the direction of said leading side thereof;

a tapered screw threaded between and engaging corresponding threads in said extending ends of said portions of said second element and cooperating with the resilient portions of said second and third elements to selectively pivot said head about said first element to adjust the peripheral position of said head on said drum; and means for holding said head against said drum, including a bolt passing loosely through a substantially larger opening in said head between said rounded ends of said first and second elements, said bolt being provided with a right-hand thread and being threaded into said drum and tightened in a clockwise turning direction to clamp said head in the position induced by said elements.

9. In a rotating head drum for a magnetic tape transport, means for mounting a plurality of transducing heads on said drum, comprising:

a plurality of identical modular elements each being selectively variable in dimension in a predetermined direction, said elements being provided in groups of three, one group for each of said transducing heads;

a first of said elements in each group being mounted on said drum and engaging the corresponding one of said heads on the radially inward end thereof and on one side, with said predetermined direction of said elements being aligned with the radius of said drum at said corresponding head;

a second of said elements in each group being mounted on said drum and engaging said corresponding head on the other side thereof, with said predetermined direction of said second element aligned transverse to said radius;

a third of said elements in each group being mounted on said drum and engaging said one side of said corresponding head, between said second element and the periphery of said drum, with said predetermined direction of said third element transverse to said radius; and means for holding each of said heads against said drum.

References Cited by the Examiner

UNITED STATES PATENTS

| | | | |
|---|---|---|---|
| 3,020,359 | 2/1962 | Pfost | 179—100.2 |
| 3,227,815 | 1/1966 | Prochnow | 179—100.2 |

BERNARD KONICK, *Primary Examiner.*

A. I. NEUSTADT, *Assistant Examiner.*